United States Patent [19]
Platner

[11] 4,091,738
[45] May 30, 1978

[54] STABILIZED FLUID RAILWAY CAR SUSPENSION

[75] Inventor: David K. Platner, Atchison, Kans.

[73] Assignee: Rockwell International Corporation, Pittsburgh, Pa.

[21] Appl. No.: 658,927

[22] Filed: Feb. 18, 1976

[51] Int. Cl.² ............... B61F 5/10; B61F 5/24; B61H 9/04; B61H 11/00
[52] U.S. Cl. .................. 105/164; 105/199 R; 105/210
[58] Field of Search ............ 105/164, 182 R, 193, 105/199 R, 210

[56] References Cited
U.S. PATENT DOCUMENTS

| | | | |
|---|---|---|---|
| 2,633,811 | 4/1953 | Poage | 105/164 X |
| 2,908,230 | 10/1959 | Dean | 105/182 R |
| 3,313,245 | 4/1967 | Sundby | 105/193 X |
| 3,646,893 | 3/1972 | Sundby | 105/182 R X |
| 3,701,397 | 10/1972 | Shirane et al. | 105/164 X |

Primary Examiner—Frank E. Werner
Assistant Examiner—Howard Beltran

[57] ABSTRACT

A railway truck employs air springs at either side of the truck to provide a secondary suspension to support a car body, or an intermediate member between the car body and truck which in turn supports the car body. Protection against possible rupture of one of the air springs is provided by pressure responsive control valves connected to and associated with each of the air springs whereby when open, the valves exhaust fluid pressure from their associated air spring. Each control valve is pressure operated to be held in closed position by the pressure in the air spring on the other side of the truck. When one air spring ruptures the valve associated with the other air spring will open to exhaust fluid pressure from the other air spring. In the absence of a rupture each valve is held closed by the pressure in the other air spring. Leveling valves are also provided to automatically control the fluid pressure admitted to and exhausted from each of the air springs in accordance with the level of the car above the truck. In the event of uneven loading laterally of the truck the leveling valves will automatically admit fluid pressure to, or exhaust pressure from their associated air springs to compensate for the uneven loading.

7 Claims, 5 Drawing Figures

STABILIZED FLUID RAILWAY CAR SUSPENSION

BACKGROUND OF THE INVENTION

The instant invention relates to railway car suspensions which employ air springs to support the car body on a truck such as is shown for example in U.S. Pat. No. 2,908,230 and dated Oct. 13, 1959 and U.S. Pat. No. 3,646,893 dated Mar. 7, 1972. In such suspensions it is customary to employ leveling valves associated with each of the air springs. The leveling valves control the supply of fluid pressure from a main source to each air spring respectively and are responsive to the level of the car above the truck to control the supply of fluid pressure to each of the air springs and thereby automatically maintain a constant level between the car and the truck in the event of uneven loading of the car laterally of the longitudinal line of the truck or car. The leveling valve associated with each air spring will operate independently of the other leveling valve to admit or exhaust pressure from its associated air spring to return each side of the car to its original height above the level of the truck. However, in the case of rupture of one of the air springs, in such systems the car would be tilted laterally with respect to the truck unless the other unruptured air spring on the other side of the truck were also exhausted. Such a tilt is undesirable in that it not only provides undesirable ride qualities but resulting unequal wheel loads increases the possibility of derailment. Therefore, it would be desirable to provide some means for automatically exhausting the unruptured air spring on the opposite side of the truck from the one which is ruptured. However, if this were done by directly interconnecting the two air springs, the pressure in each air spring would always be the same as the pressure in the other. Under such conditions it would be impossible to correct for uneven lateral loading of the car.

SUMMARY OF THE INVENTION

The problem outlined above is solved by the instant invention by providing pressure responsive pilot operated control valves associated with each air spring. The control valves are spring biased open and are connected to respective air springs to exhaust the air springs in the open position and to block the escape of fluid pressure from the air springs in the closed position. Each valve operates in response to fluid pressure and the pressure sensitive control member of each valve is connected to the fluid pressure within the air spring on the opposite side of the truck. Thus in normal operation the valves are held closed by the fluid pressure in the air spring on the opposite side of the truck and prevent the escape of pressure from their associated air springs. However when one air spring is ruptured the bias of the fluid pressure on the control valve associated with the air spring on the opposite side of the truck is removed and the valve is then urged to the open position under the influence of a mechanical spring bias to exhaust the pressure from the air spring on the opposite side of the truck from the ruptured air spring. Thus upon rupture of the air spring on either side of the truck the air spring on the other side of the truck will automatically be exhausted so that the car will be supported on the same level on each side of the truck. However, during normal operation, in the absence of a rupture of either air spring the control valves are closed and the air springs are therefor isolated and the flow of fluid to each of them is controlled solely by its respective leveling valve.

Accordingly, it is an object of the present invention to provide a control system for an air spring suspension which upon rupture of the air spring on one side of the truck automatically exhausts the air spring on the other side of the truck.

It is another object of the present invention to provide a fluid pressure control system for an air spring railway car suspension which provides for automatic exhaust of one air spring upon rupture of the other yet maintains the two air springs isolated from one another during normal operation.

It is a further object of the invention to provide a control system for air spring railway car suspensions which during normal operation will respond to and correct for uneven lateral loading of the car and which upon rupture of the air spring on one side of the truck will automatically provide for exhaust of the air spring on the other side of the truck.

Further objects of the present invention will appear as the description hereinafter proceeds.

DESCRIPTION OF THE PREFERRED EMBODIMENT

Figure 1:
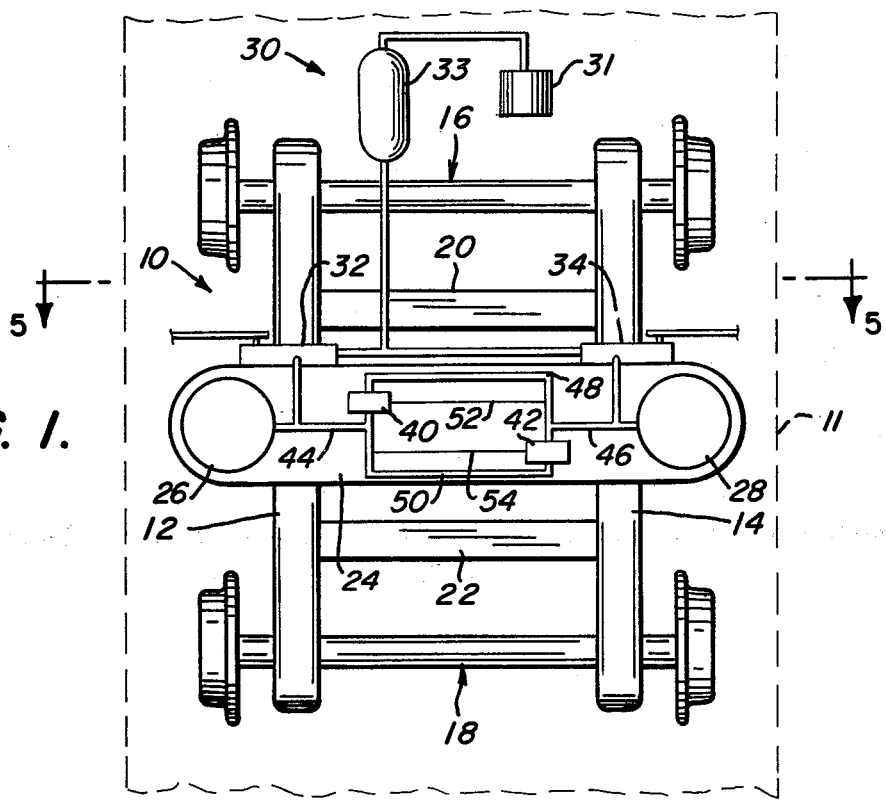
FIG. 1 is a top plan view of a car body support on a railway truck in connection with which the present invention may be used.

FIG. 1 shows a truck indicated generally by the numeral 10 disposed below a railway car 11. The truck 10 is comprised of side frames 12 and 14 supported on front and rear wheel and axle assemblies indicated respectively by the numerals 16 and 18. The manner of supporting the side frames 12 and 14 on the wheel and axle assemblies 16 and 18 is well known in the art for example as shown in the aforementioned U.S. Pat. No. 3,313,245. Side frames 12 and 14 may be rigidly connected to each other by means of transom members 20 and 22 in the manner disclosed for example in U.S. Pat. No. 2,908,230, or may be connected for articulation with respect to each other in the manner disclosed in U.S. Pat. No. 3,313,245.

Spring support member 24 extends laterally of the truck at a point midway between the front and rear wheel and axle assemblies with the ends thereof overlaying the side frames 12 and 14 in a manner similar to that disclosed in U.S. Pat. No. 2,908,230. Air springs 26 and 28 are supported on the outboard end of the spring support member 24 and are adapted to support the under portions of a railway car in a manner shown for example in U.S. Pat. No. 2,908,230 or an intermediate member in the manner disclosed in U.S. Pat. No. 3,646,893.

A source of fluid pressure preferably air pressure 30 is carried by the car 11 in the form of a compressor 31 and supply tank 33 and is connected to air springs 26 and 28 through level control valves 32 and 34 respectively. Typical level control valves are disclosed in U.S. Pat.

Figure 5:
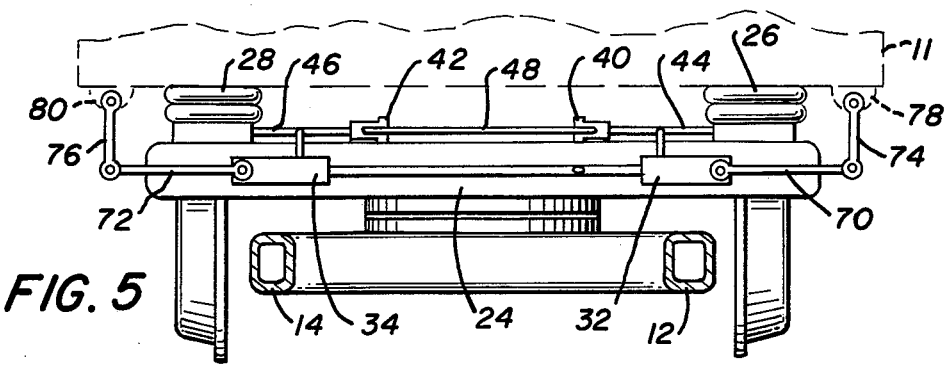
FIG. 5 is a sectional view as seen along line 5—5 of FIG. 1.

Nos. 2,841,178; 2,929,407; 2,929,619; 2,929,620; 2,929,621; 2,942,623; 2,947,322 and 2,947,530. Level control valve 32 includes an operating lever which is connected to the car 11, is adapted to sense the level of the car body above side frame 12 and operates to supply or exhaust air pressure from air spring 26 in accordance with the level of the car body above the frame 12 all in the manner well known in the art. In a similar manner level valve 34 controls the supply of air pressure to or exhaust of air pressure from air spring 28 in accordance with the level of the car body above the side frame 14. As best seen in FIG. 5, the level control valves 32 and 34 are mounted on the spring support member 24. An operating lever 70, 72 extends outwardly of each level control valve 32, 34. A coupling 74, 76 extends between the extended end of each lever 70, 72 and a connecting point 78, 80 on the car 11. If the car 11 is loaded to the right to compress the air spring 26, the operating lever 70 will rotate downwardly to cause the level control valve to supply air to the spring 26 until the car 11 is returned to a level position. When the load is released the spring 26 will raise the car 11 above the position shown to rotate the operating lever 70 upwardly and cause the level control valve to exhaust air from the air spring 26 until the car 11 is again level. The configuration for level control valve 34 operates in a similar manner.

Figure 2:
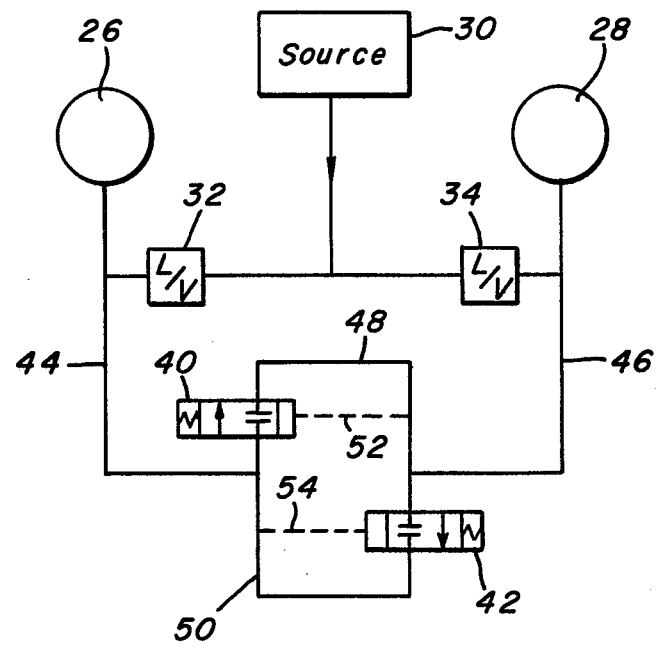
FIG. 2 is a schematic diagram of the fluid pressure control system embodying the invention hereof.

Control valves 40 and 42 are also well known and commercially available valves. Valves 40 and 42 as shown in the schematic diagram in FIG. 2, are spring biased to an open position and fluid pressure operated to a closed position. The inlet of valve 40 is connectd to air spring 26 by means of conduit 44. In like manner the inlet of valve 42 is connected to air spring 28 through conduit 46. The outlet of valve 40 is connected to conduit 46 through conduit 48 while the outlet of valve 42 is connected to conduit 44 and air spring 26 through conduit 50. Dotted line 52 is the pilot line for valve 40 and connects the control element of valve 40 with conduit 46 and air spring 28. Similarly the dotted line 54 is the pilot line for valve 42 and connects the control element of control valve 42 to conduit 44 and air spring 26. When pilot lines 52 and 54 are connected to a source of pressure of a preselected magnitude valves 40 and 42 are respecitvely held in a closed position against the bias of their springs in which position they are shown in FIG. 2. When the pressure in the pilot lines 52 and 54 is relieved the valves are urged to their open position under the bias of their respective springs.

Figure 3:
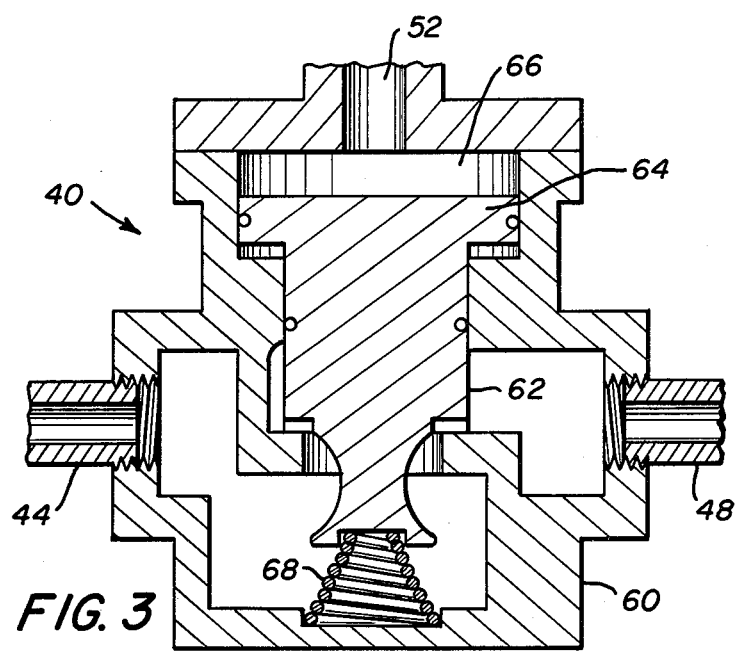
FIG. 3 is a sectional side view of the preferred control valve shown in the normal closed position.
Figure 4:
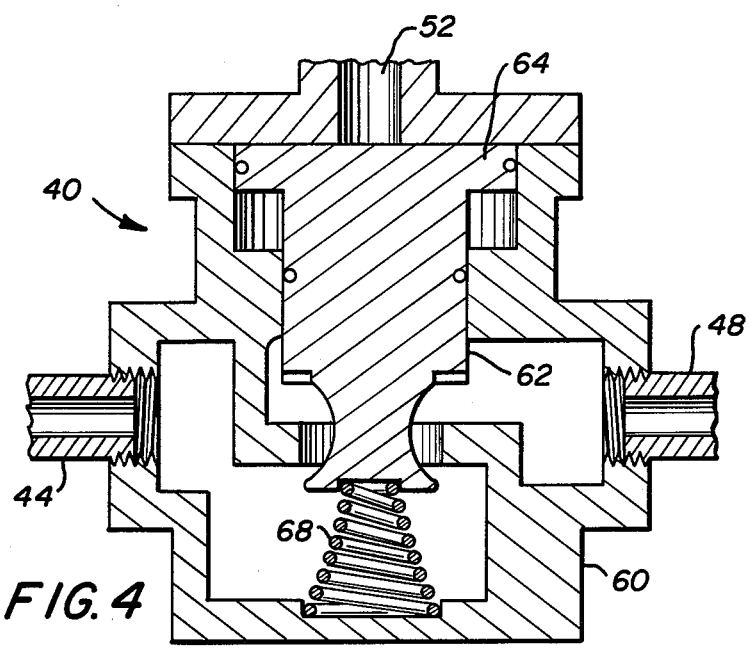
FIG. 4 is a sectional side view of the valve shown in FIG. 3 shown in the open position.

To further demonstrate the operation of the control valves 40 and 42, a typical control valve 40 is shown in FIGS. 3 and 4. The valve 40 includes a body 60 and a movable isolation member 62 mounted therein. An actuation piston 64 is formed in the upper portion of the isolation member 62 and is disposed within a chamber 66 formed in the upper portion of the body 60. A spring 68 is compressively mounted between the isolation member 62 and an outer wall of the body 60 to bias the isolation member to the open position. Pilot line 52 communicates with the chamber 66 while conduit 44 provides the inlet to the valve and conduit 48 is joined to the discharge side thereof. As seen in FIG. 3, air pressure is provided to the chamber through pilot line 52 to act on the actuation piston 64, closing the valve against spring pressure. In this condition air is prevented from passing from conduit 44 to conduit 48. However, if no air pressure is provided through pilot line 52, the spring 66 will open the valve element 62, as shown in FIG. 4, to allow air to communicate from conduit 44 to conduit 48.

In normal operation air under pressure in the order of 100 psi will be supplied from the source 30 to air springs 26 and 28 through their respective leveling valves 32 and 34. As the car is loaded or unloaded the leveling valves will sense variations in the level of the car body above the truck and will be operated to either supply air to or exhaust air from their respective air springs. Since the interior of air springs 26 and 28 are under pressure, both valves 40 and 42 will be maintained in their closed position by pressure supplied through conduits 46 and 52, and 44 and 54 respectively. Thus air springs 26 and 28 are isolated from each other under normal operating conditions, that is there is no direct fluid communication between the two under normal operating conditions.

It frequently happens that the car is unevenly loaded laterally with respect to its longitudinal center line. For example, in the event the left side of the car as viewed in FIGS. 1 and 2 is loaded more than the right side, air spring 26 would be temporarily compressed more than air spring 28. However, since the two leveling valves operate independently from each other and are positioned and adapted to sense the relative positions of the car above their respective side frames the level sensing mechanism of valve 32 will be operated to supply air pressure to the spring 26 until the car is returned to its original level above the frame 12. In the same manner the level sensing mechanism of valve 34 will operate to supply only enough pressure to or exhaust pressure from spring 28 whereby the level of the car above frame 14 is returned to the same original position. Thus, by maintaining the air springs 26 and 28 isolated from each other the leveling system is adapted to compensate for uneven as well as even car loading.

In the event of rupture of one of the air springs, for example air spring 28, the pressure will be exhausted from the air spring 28 and conduit 46. It should be understood that level valves 32 and 34 include a one way valve which will permit the flow of fluid from the source 30 to the respective air springs 26 and 28 but will prevent a flow of fluid through the lveling valves in a reverse direction. Valves 32 and 34 also contain rate of flow limiting valves which operate to prevent the source 30 from becoming exhausted when one of the air springs is ruptured. Because of the rate of flow limiting valve within it, restricted flow will take place through the level valve 34 when pressure is completely exhausted from air spring 28 and conduit 46. At this point pressure will also be exhausted from pilot line 52 whereby valve 40 will be positioned by its spring to open position thereby connecting air spring 26 to conduit 46 through conduits 44, valve 40 and conduit 48. Thus when the pressure within air spring 28 is exhausted, valve 40 is positioned to also exhaust the pressure from air spring 26.

In the same manner control valve 42 will be positioned to connect air spring 28 to air spring 26 through conduit 46, valve 42 and conduits 50 and 44 to exhaust the pressure from air spring 28 upon rupture of air spring 26.

In normal operation in the absence of rupture of either air spring, valves 40 and 42 will remain closed thereby isolating the air spring 26 from air spring 28 and allowing level valves 32 and 34 to operate independently to control the level of the car body above the side frames 12 and 14 respectively.

It is possible to eliminate conduits 48 and 50 and allow valves 40 and 42 when open to exhaust directly to the atmosphere rather than through conduits 48, 46 and air spring 28 or conduits 50, 44 and air spring 26 as the case may be. In such a case, however, it would be impossible to initially charge the system with air pressure unless the outlets of the valves 40 and 42 were closed by other means. Initially, before the system is charged with air pressure, valves 40 and 42 are open because there is no pressure in pilot lines 52 and 54 and the valves would remain open allowing pressure from the source to escape to the atmosphere unless the outlets of these valves were closed temporarily during the initial charging operation. This could be done by connecting the outlets to stop valves which would then be opened after the system was fully charged with air pressure.

The invention hereinabove described therefore provides a control for an air spring railway car suspension which provides rupture protection in that upon rupture of one air spring on one side of the truck, the air spring on the other side of the truck is also exhausted, while under normal operation the air springs are isolated from each other whereby offcenter loads may be compensated for by operation of the leveling valves.

It will be understood that FIGS. 1 and 2 show the invention as used with one of the two trucks supporting the railway car at its opposite ends and that a control system identical to that shown in FIGS. 1 and 2 may be used with the truck at the opposite end of the car. Also, while the invention has been described mainly in connection with the suspension as shown in U.S. Pat. No. 2,908,230 in which the suspension is located between the truck and the car body the instant invention is equally applicable to other suspensions such as that shown in U.S. Pat. No. 3,646,893 in which the air springs are mounted directly on the side frames and support a car support member on which in turn the car body is supported.

I claim:

1. A railway truck comprising a frame member, a car support member extending laterally of said frame member, air spring means mounted at either end of said car support member for supporting a car body, a source of air pressure, means to connect said air spring means to said source of air pressure, air pressure actuated control valves respectively associated with the air spring means at either end of said support member adapted to prevent the escape of pressure from respective air spring means in valve closed position and to exhaust pressure from respective air spring means in valve open position, pressure responsive control means associated with each of said control valves respectively for moving said valves between said valve open position and said valve closed position, means connecting said control means for communication with the air spring means at the opposite end of said car support member so that normal air pressure therein will maintain said control valve in said valve closed position and loss of said pressure therein to a selected value substantially below said normal air pressure will cause said control means to move said control valve to said valve open position.

2. A railway truck having means to support a car body thereon comprising air spring means mounted on each side of said truck for supporting said car body, conduit means to connect said air spring means to a source of air pressure, leveling valve means in said conduit means responsive to the level of said car above said truck to control the supply of pressure from said source to said air spring means and the exhaust of pressure from said air spring means in accordance with the level of said car above said truck, control valves respectively associated with said air spring means on each side of said truck adapted to prevent the escape of pressure from respective air spring means in valve closed position and to exhaust pressure from respective air spring means in valve open position, pressure responsive control means associated with each of said control valves respectively for moving said valves between said valve open position and said valve closed position, means connecting said control means in communication with the air spring means at the opposite side of said truck so that normal air pressure therein will maintain said control valve in said valve closed position and loss of said air pressure therein to a value substantially below said normal air pressure will cause said control means to move said control valve to said valve open position.

3. The railway truck defined in claim 2 in which each of said presure responsive control means is responsive to the pressure in the air spring means on the opposite side of said truck from the air spring with which it is associated to close said control valves when the pressure in said air spring means on the opposite side of said truck is above said selected value and to allow said control valves to open when the pressure in said air spring means on the opposite side of said truck is below said selected value.

4. In combination with a railway truck, means for suspending a car body on said truck comprising; first air spring means mounted on one side of said truck for supporting said car body, second air spring means mounted on the other side of said truck for supporting said car body, a source of air pressure, means connecting said source of pressure to said first and second air spring means, a first control valve connected to said first air spring means operative in open position to exhaust pressure from said first air spring means, a second control valve connected to said second air spring means operative in open position to exhaust fluid pressure from said second air spring means, first pressure responsive control means operative to move first control valve between a valve open and a valve closed position, second pressure responsive control means operative to move said second control valve between a valve open and valve closed position, means connecting said first pressure responsive control means in communication with said second air spring means whereby said first pressure responsive control means is operative to maintain said first control valve in closed position when the pressure in said second air spring means is above a selected value and to open said first control valve when the pressure in said second air spring means is below said selected value, means connecting said second pressure responsive control means in communication with said first air spring means whereby said pressure responsive control means is operative to maintain said second control valve in closed position when the pressure in said first air spring means is above a selected value and to open said second control valve when the pressure in said first air spring means is below said selected value, said selected value being substantially less than the normal air pressure in said air spring means.

5. The combination defined in claim 4 together with a first leveling valve responsive to the level of said car body above said one side of said truck to control the supply of pressure from said source to said first air spring means in accordance with the level of said car body above said one side of said truck, and a second leveling valve responsive to the level of said car body above said other side of said truck to control the supply of pressure from said source to said second air spring means in accordance with the level of said car body above said other side of said truck.

6. A suspension for suspending railway cars on a truck comprising air springs mounted on either side of said truck adapted to support a car body, a source of air pressure, leveling valves associated with each air spring respectively and adapted to control the supply of air pressure thereto to maintain constant the level of said car above the side of the truck on which the respective air springs are mounted, pressure responsive control valves associated respectively with each air spring having a control element for closing said control valve upon application thereto of pressure of a selected value, said control valves being connected to respective air springs to exhaust pressure therefrom when in open position and to prevent the escape of pressure therefrom when in closed position, means for placing said control elements respectively in fluid communication with the air springs on the opposite side of said truck whereby said control valves are maintained in closed position when the pressure within said last mentioned air spring is above a selected value, and are opened when the pressure in said last mentioned air springs is below said value, said selected value being substantially less than the normal air pressure in said air spring.

7. The suspension of claim 6 in which the outlet of each of said control valves is connected to said last mentioned air springs.

* * * * *

UNITED STATES PATENT AND TRADEMARK OFFICE
CERTIFICATE OF CORRECTION

PATENT NO. : 4,091,738
DATED : May 30, 1978
INVENTOR(S) : David K. Platner

It is certified that error appears in the above—identified patent and that said Letters Patent are hereby corrected as shown below:

Column 2, line 25, after "body" delete 'support' and insert --supported--.

Signed and Sealed this

Sixteenth Day of January 1979

[SEAL]

Attest:

RUTH C. MASON
Attesting Officer

DONALD W. BANNER
Commissioner of Patents and Trademarks